(12) United States Patent
Ko et al.

(10) Patent No.: US 8,682,257 B2
(45) Date of Patent: Mar. 25, 2014

(54) METHOD AND APPARATUS FOR DETECTING HETEROGENEOUS COMMUNICATION SYSTEM

(75) Inventors: Gwang Zeen Ko, Daejeon-si (KR); Sung Jin You, Daejeon-si (KR); Jin Suk Pak, Daegu-si (KR); Sung Hyun Hwang, Daejeon-si (KR); Sang Won Kim, Daejeon-si (KR); Jung Sun Um, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 179 days.

(21) Appl. No.: 13/268,427

(22) Filed: Oct. 7, 2011

(65) Prior Publication Data

US 2012/0135689 A1      May 31, 2012

(30) Foreign Application Priority Data

Nov. 25, 2010   (KR) ......................... 10-2010-0118273

(51) Int. Cl.
*H04B 17/00*      (2006.01)
(52) U.S. Cl.
USPC ....................................................... 455/67.11

(58) Field of Classification Search
USPC ....................................................... 455/67.11
See application file for complete search history.

(56) References Cited

U.S. PATENT DOCUMENTS

| 7,693,035 B2 * | 4/2010 | Hasegawa et al. | 370/208 |
| 7,990,944 B2 * | 8/2011 | Stanwood et al. | 370/350 |
| 2010/0182928 A1 * | 7/2010 | Wu et al. | 370/252 |

FOREIGN PATENT DOCUMENTS

| JP | 2009-118453 | 5/2009 |
| KR | 10-2010-0040592 | 4/2010 |

* cited by examiner

*Primary Examiner* — April G Gonzales
(74) *Attorney, Agent, or Firm* — Staas & Halsey LLP

(57) ABSTRACT

A method and apparatus for detecting a heterogeneous communication system is provided. The apparatus include a radio frequency (RF) signal reception unit configured to receive a signal from a particular communication system, a silent duration evaluation unit configured to evaluate a silent duration between frames on the basis of the received signal, and a system type decision making unit configured to determine the type of the particular communication system on the basis of the evaluated silent duration.

14 Claims, 4 Drawing Sheets

METHOD AND APPARATUS FOR DETECTING HETEROGENEOUS COMMUNICATION SYSTEM

CROSS-REFERENCE TO RELATED APPLICATIONS

This application claims the benefit of priority of Korean Patent application No. 10-2010-0118273 filed on Nov. 25, 2010, which is incorporated by reference in their entirety herein.

BACKGROUND OF THE INVENTION

1. Field of the Invention

The present invention relates to wireless communication and, more particularly, to a method and apparatus for detecting a heterogeneous communication system on the basis of a silent duration evaluation in a wireless communication system.

2. Related Art

An industrial, scientific and medical (ISU) band used for industrial, scientific, and medical purposes, rather than for a communication purpose, a band (e.g., a TV band) employing a cognitive ratio (CR) technique, and the like, are open spectrum bands communication devices using different protocols share to use. Various communication devices operating in the open spectrum band may need to detect whether or not different types of communication devices operate, as well as to detect whether or not the same type of communication devices as that of the communication devices operate. Namely, each of the communication devices must detect whether or not the same type of communication devices operate and whether or not communication devices belonging to different types of communication systems operate to determine whether or not communication has started and communication quality. Thus, in order to detect a heterogeneous communication system, a proper detection apparatus for detecting a signal strength and a spectrum pattern, or the like, is required.

Recently, as communication devices using the open spectrum band increase, a coexistence technique allowing heterogeneous communication system using the open spectrum band to coexist is required. Also, in order to apply the coexistence technique, heterogeneous communication systems operating in the open spectrum band must be first detected. In this case, however, whether or not heterogeneous communication systems exist may be determined through an energy detection method of determining the presence or absence of a transmitted signal, but it is difficult to determine what kind of types the heterogeneous communication systems are. In addition, the determining of the types of heterogeneous systems requires an algorithm for capturing a relatively complicated signal and determining the type of the signal, increasing the system complexity.

Thus, generally, without a coexistence technique, communication devices operating in the open spectrum band operate such that, when communication quality is degraded, they move to a different band. Alternatively, in order to determine types of heterogeneous communication systems, a somewhat complicated algorithm, such as capturing a signal for a certain period and cyclo-stationary-detect it by using a fast Fourier transform (FFT), and the like, has been used.

Therefore, a method for easily and effectively detecting types of heterogeneous communication systems is required.

SUMMARY OF THE INVENTION

The present invention provides a method and apparatus for detecting a heterogeneous communication system on the basis of an evaluation of a silent duration in a wireless communication system.

In an aspect, an apparatus for detecting a heterogeneous communication system is provided. The apparatus include a radio frequency (RF) signal reception unit configured to receive a signal from a particular communication system, a silent duration evaluation unit configured to evaluate a silent duration between frames on the basis of the received signal, and a system type decision making unit configured to determine the type of the particular communication system on the basis of the evaluated silent duration.

The particular communication system may perform a data transmission by frame.

The silent duration may be different for communication systems.

The silent duration may be a duration between a downlink frame and an uplink frame or a duration between an uplink frame and a downlink frame.

The silent duration evaluation unit may be configured to eliminate a delayed signal among the received signals.

The system type decision making unit may determine the type of the particular communication system on the basis of a system type database. The system type database may comprise information regarding the silent duration corresponding to the type of the communication system.

In another aspect, a method for detecting a heterogeneous communication system is provided. The method include receiving a signal from a particular communication system, evaluating a silent duration between frames on the basis of the received frame, and determining the type of the particular communication system on the basis of the evaluated silent duration.

The particular communication system may perform a data transmission by frame.

The silent duration may be different for communication systems.

The silent duration may be a duration between a downlink frame and an uplink frame or a duration between an uplink frame and a downlink frame.

The method may further include eliminating a delayed signal among the received signals.

The system type decision making unit may determine the type of the particular communication system on the basis of a system type database. The system type database may comprise information regarding the silent duration corresponding to the type of the communication system.

DESCRIPTION OF EXEMPLARY EMBODIMENTS

Hereinafter, some embodiments of the present invention are described in detail with reference to the accompanying drawings in order for those skilled in the art to be able to readily implement the invention. However, the present invention may be modified in various different ways and are not limited to the following embodiments. In order to clarify a description of the present invention, parts not related to the description are omitted, and the same reference numbers are used throughout the drawings to refer to the same or like parts. Further, a description of parts which can be easily understood by those skilled in the art is omitted.

When it is said that any part "includes (or comprises)" any constituent element, it means that the corresponding part may further include other constituent elements unless otherwise described without excluding other constituent elements.

In this specification, a terminal may refer to a Mobile Station (MS), a Mobile Terminal (MT), a Subscriber Station (SS), a Portable Subscriber Station (PSS), User Equipment (UE), an Access Terminal (AT) or the like and may include some or all of the functions of the MS, the MT, the SS, the PSS, the UE, or the AT. In this specification, a Base Station (BS) may refer to an Access Point (AP), a Radio Access Station (RAS), a Node B, an evolved NodeB (eNodeB), a Base Transceiver Station (BTS), or a Mobile Multihop Relay (MMR)-BS and may include some or all of the functions of the AP, the RAS, the Node B, the eNodeB, the BTS, or the MMR-BS.

Meanwhile, downlink (DL) refers to communication from a BS to a terminal, and it may be referred to as a forward link. Uplink (UL) refers to communication from a terminal to a BS, and it may be referred to as a reverse link. In downlink, a transmitter can be a part of a BS and a receiver can be a part of an MS. In uplink, a transmitter can be a part of an MS and a receiver can be a part of a BS.

The present invention proposes a method and apparatus for detecting a heterogeneous communication system based on the measurement of a silent duration. The silent duration refers to a period during which a signal of a heterogeneous communication system operating in the same band is not transmitted, in order to providing a coexistence method guaranteeing a smooth mutual operation between communication systems operating in an open spectrum band. Namely, the proposed invention provides a method of determining information regarding a silent duration during which a heterogeneous communication system does not transmit a signal by using an energy detection method for only determining whether or not a signal has been transmitted, and comparing the determination information with a silent duration database to thus determine the type of the heterogeneous communication system.

Figure 1:
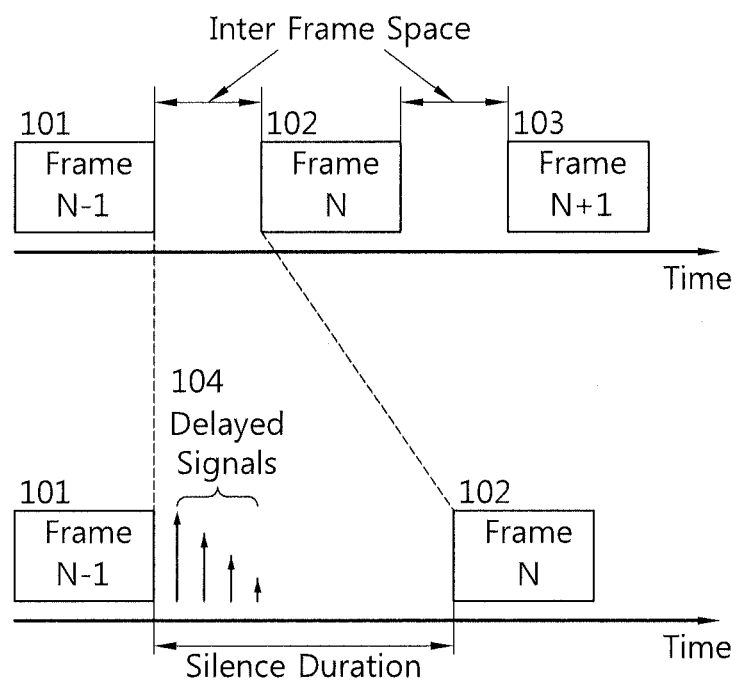
FIG. 1 is a view illustrating a silent duration when a frame is transmitted in an ad-hoc network.

FIG. 1 is a view illustrating a silent duration when a frame is transmitted in an ad-hoc network.

The recent communication system performs a data transmission by frame in order to effectively transmit various types of data. The ad-hoc network basically facilitates point-to-multipoint communication or multipoint-to-multipoint communication, and respective communication systems within the ad-hoc network are allocated a particular duration in which each frame can be transmitted in a time axis through a negotiation between the communication systems or arbitrarily, and transmit a frame during the corresponding duration.

With reference to FIG. 1, frames 101, 102, and 103 are transmitted at certain periods in a communication system. The space between the frames, namely, the space between the frame N−1 101 and the frame N 102 or the space between the frame N 102 and the frame N+1 103 may be defined as an inter-frame space (IFS) which may be a silent duration in which a signal is not transmitted. The IFS is a basic element required for effectively operating a basic frame processing time of the same type of communication devices that transmit respective frames and the overall network. The length of the IFS may be different by communication system. This is because the size of networks, mobility of networks, the length of frames, and the like, of the respective communication systems are different. The present invention proposes determining the type of each of communication systems by using the fact that the silent duration of each of the communication systems is different.

Meanwhile, in order to effectively evaluate a silent duration, a delay signal must be appropriately processed. With reference to FIG. 1, some of signals transmitted during the frame N−1 101 are delayed to be transmitted (104). The delayed signals change according to the location and movement speed of the communication systems, so the effect of the delay signals can be eliminated by observing them for a certain period of time.

Figure 2:
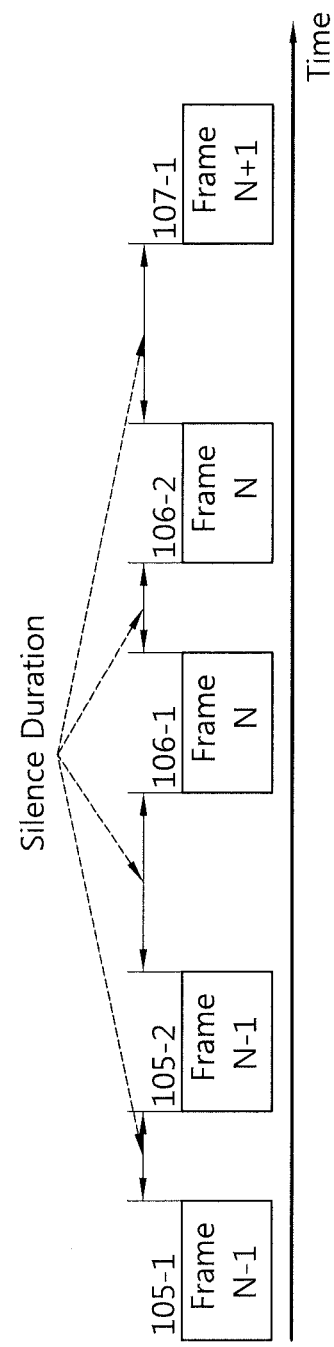
FIG. 2 is a view illustrating the configuration of silent durations when frames are transmitted in a network including a base station and a terminal.

FIG. 2 is a view illustrating the configuration of silent durations when frames are transmitted in a network including a base station and a terminal.

In the network including the base station and the terminal, a downlink frame transmitted by the base station and an uplink frame transmitted by the terminal are defined. With reference to FIG. 2, a downlink frame 105-1 is transmitted, and an uplink frame N−1 105-2 is then transmitted after the lapse of a first silent period. Also, a downlink frame N 106-1 is transmitted after the lapse of a second silent duration, and an uplink frame N 106-2 is then transmitted after the lapse of the first silent duration. Thereafter, a downlink frame N+1 107-1 is transmitted after the lapse of the second silent duration. In FIG. 2, the downlink frames and the uplink frames are alternately transmitted, but the present invention is not limited thereto and downlink frames and uplink frames may be variably configured and transmitted from the base station and the terminal. The duration in which the downlink frames 105-1, 106-1, and 107-1 are transmitted and the duration in which the uplink frames 105-2 and 106-2 are transmitted may be the same or different. Also, the length of the first silent duration between the downlink frame and the uplink frame and the length of the second silent duration between the uplink frame and the downlink frame may be equal or different. Meanwhile, the downlink/uplink frame transmission period and silent duration of the heterogeneous communication systems may be different. The types of the heterogeneous communication systems may be detected by determining the silent duration which is different for each of the heterogeneous communication systems.

Figure 3:
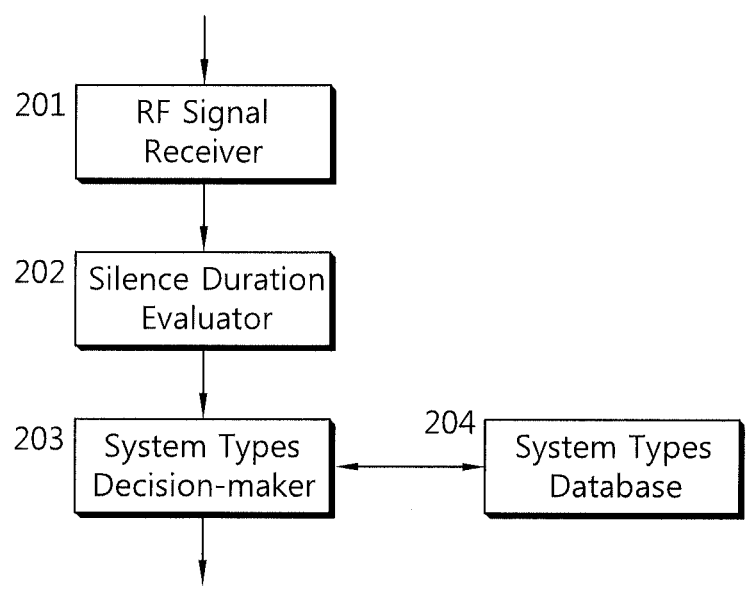
FIG. 3 is a schematic block diagram of a proposed apparatus for detecting a heterogeneous communication system.

FIG. 3 is a schematic block diagram of a proposed apparatus for detecting a heterogeneous communication system.

The apparatus for detecting a heterogeneous communication system illustrated in FIG. 3 may include a radio frequency (RF) signal receiver 201, a silent duration evaluator 202, a system type decision maker 203, and a system type database 204. The RF signal receiver 201 receives a signal from a particular communication system. The particular communication system performs a data transmission by frame. The silent duration evaluator 202 evaluates a silent duration between frames on the basis of the received signal. In this case, the effect of a signal delayed in the frame may be removed by the silent duration evaluator 202. The system type decision maker 203 determines the type of a communication system on the basis of the evaluated silent duration. The system type decision maker 203 determines the type of the system corresponding to the evaluated silent duration on the basis of the system type database 204.

Figure 4:
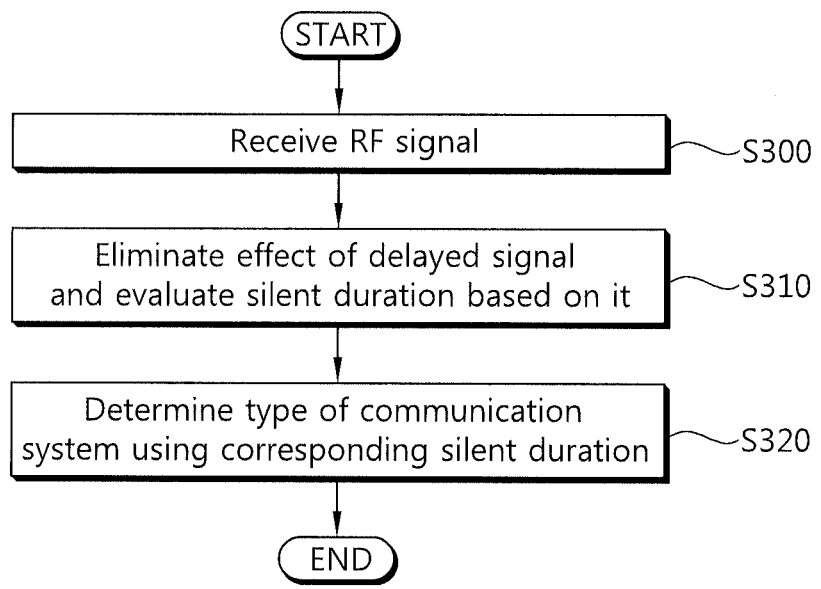
FIG. 4 is a flow chart illustrating the process of a proposed method for detecting a heterogeneous communication system.

FIG. 4 is a flow chart illustrating the process of a proposed method for detecting a heterogeneous communication system.

In step S300, the apparatus for detecting a heterogeneous communication system receives a signal from a particular communication system. The particular communication system performs a data transmission by frame.

In step S301, the apparatus for detecting a heterogeneous communication system evaluates a silent duration between frames on the basis of the received signal. The effect of a signal delay in the frame can be eliminated.

In step S302, the apparatus for detecting a heterogeneous communication system determines the type of a communication system using the silent duration on the basis of the evaluated silent duration. In this case, the apparatus for detecting a heterogeneous communication system may determine the type of the system corresponding to the evaluated silent duration on the basis of the system type database.

In this manner, the type of a heterogeneous communication system can be effectively detected by using only the energy detection method that determines only the presence or absence of a signal.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. An apparatus for detecting a heterogeneous communication system, the apparatus comprising:
    a radio frequency (RF) signal reception unit configured to receive a signal from a particular communication system;
    a silent duration evaluation unit configured to evaluate a silent duration between frames on the basis of the received signal; and
    a system type decision making unit configured to determine the type of the particular communication system on the basis of the evaluated silent duration,
    wherein the silent duration is a period during which a signal of a heterogeneous communication system is not transmitted.

2. The apparatus of claim 1, wherein the particular communication system transmits data in frames.

3. The apparatus of claim 1, wherein the silent duration is different for heterogeneous communication systems.

4. The apparatus of claim 1, wherein the silent duration is a duration between a downlink frame and an uplink frame or a duration between an uplink frame and a downlink frame.

5. The apparatus of claim 1, wherein the silent duration evaluation unit is configured to eliminate a delayed signal among the received signals.

6. The apparatus of claim 1, wherein the system type decision making unit determines the type of the particular communication system on the basis of a system type database.

7. The apparatus of claim 6, wherein the system type database comprises information regarding the silent duration corresponding to the type of the communication system.

8. A method for detecting a heterogeneous communication system, the method comprising:
    receiving a signal from a particular communication system;
    evaluating a silent duration between frames on the basis of the received frame; and
    determining the type of the particular communication system on the basis of the evaluated silent duration,
    wherein the silent duration is a period during which a signal of a heterogeneous communication system is not transmitted.

9. The method of claim 8, wherein the particular communication system transmits data in frames.

10. The method of claim 8, wherein the silent duration is different for heterogeneous communication systems.

11. The method of claim 8, wherein the silent duration is a duration between a downlink frame and an uplink frame or a duration between an uplink frame and a downlink frame.

12. The method of claim 8, further comprising:
    eliminating a delayed signal among the received signals.

13. The method of claim 8, wherein the type of the particular communication system is determined on the basis of a system type database.

14. The method of claim 13, wherein the system type database comprises information regarding the silent duration corresponding to the type of the communication system.

* * * * *